350-377 SR XR 3,496,483
CROSS REFERENCE
SEARCH ROOM
Feb. 17, 1970 E. MAX ET AL 3,496,483
LASER POLARIZATION MODULATION TECHNIQUES
Filed Feb. 28, 1964 3 Sheets-Sheet 1
FIG. 1
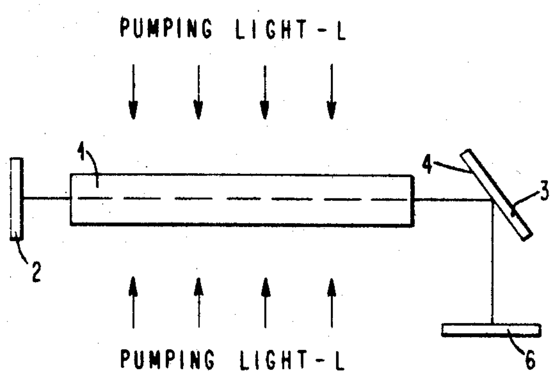
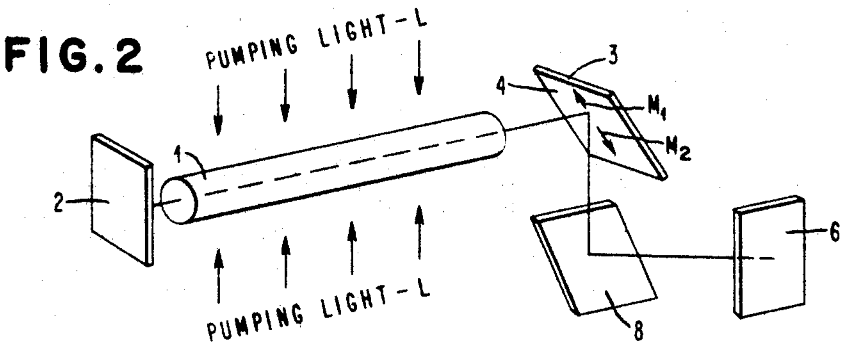
FIG. 2
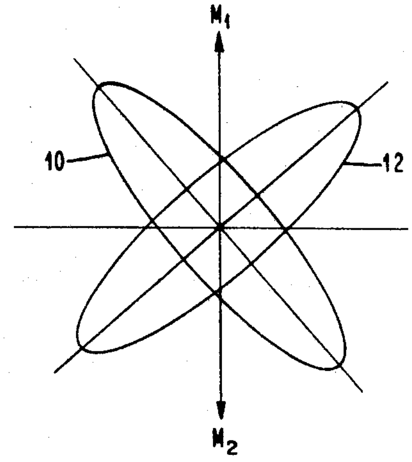
FIG. 3
INVENTORS
ERHARD MAX
PAUL T. CHANG
BY Ralph E. Dustin
ATTORNEY
3496483
OR IN 331/94.5C FIG. 4
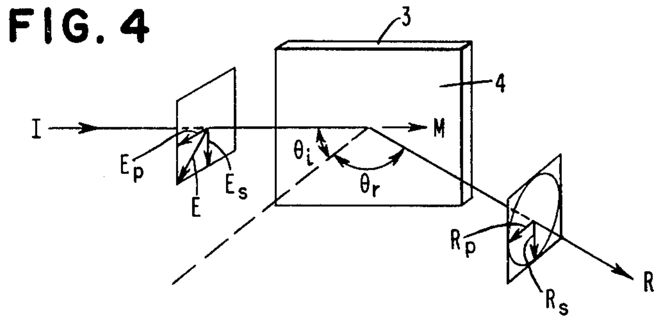
FIG. 5
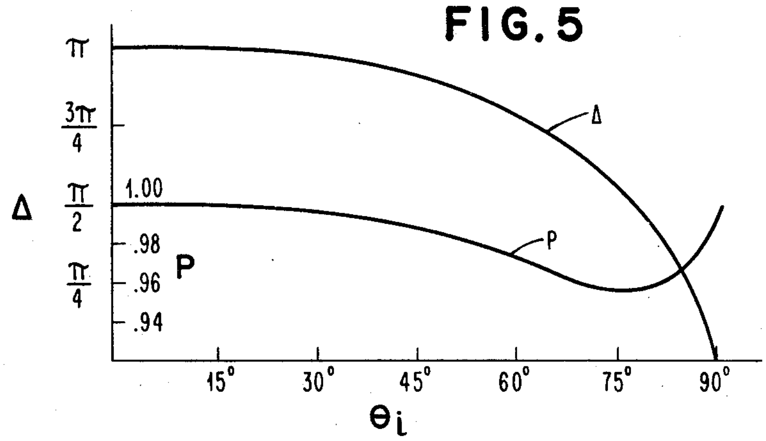
FIG. 6
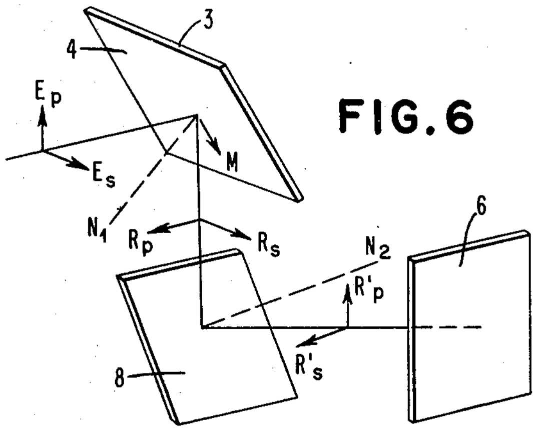
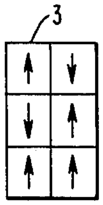
FIG. 8
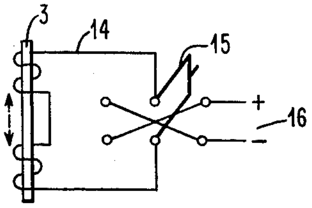
FIG. 9

Feb. 17, 1970 E. MAX ET AL 3,496,483

LASER POLARIZATION MODULATION TECHNIQUES

Filed Feb. 28, 1964 3 Sheets-Sheet 3

United States Patent Office 3,496,483
Patented Feb. 17, 1970

1

3,496,483

LASER POLARIZATION MODULATION TECHNIQUES

Erhard Max, Wappingers Falls, and Paul T. Chang, Poughkeepsie, N.Y., assignors to International Business Machines Corporation, New York, N.Y., a corporation of New York Filed Feb. 28, 1964, Ser. No. 348,120
Int. Cl. H01s *3/00;* G02b *5/30, 27/28*
U.S. Cl. 331—94.5 14 Claims

ABSTRACT OF THE DISCLOSURE

Apparatus is provided for modulating the coherent light provided by a lasing device. Alterable means in the form of a patterned element is positioned in the cavity for effecting the polarization of the light emitted by the active medium of the laser device to enable the filaments of light to have polarizations corresponding to the pattern on the element.

This invention relates to mechanisms for producing a beam of polarized light, and more particularly to lasers having means associated therewith for changing their polarization status and thus the polarity of the light emanating therefrom.

It is well known that a very high energy beam of coherent light may be obtained from a negative temperature medium, such as a ruby, when it is subjected to the optical pumping action of an intense light. The pumping energy of the light causes electrons in the selected medium to become excited to metastable energy levels so as to emit photons of a narrow frequency band spontaneously at random, some of the photons being reflected between mirrors at opposite ends of the medium and effecting a stimulation of other electrons which, in turn, emit photons in phase. A chain reaction takes place and effects an amplification of the light pulse many times. In continuous operation, however, stable conditions will be achieved after a few reflections and there will be provided a constant radiation energy inside the cavity and at the output. One of the mirrors is made only partially reflecting so that a very narrow band light passes through it in a beam that may be employed for various uses.

Light obtained from lasers having an active medium of certain materials, such as the ruby oriented in a proper manner, is unpolarized. As the light is reflected back and forth between the mirrors it assumes an uncertain degree and direction of polarization. By placing within the laser cavity between the active medium and one of the mirrors a device which may be conditioned to effect a predetermined polarization of the light in either one direction or another as desired, there is provided a means by which stored information may be transmitted through a light beam to any desired point of use. Since the light is coherent, the device may be divided into many portions, each determining the lasing action in a different filament of the medium to produce light from the filament polarized in either one direction or another. It will be seen that the direction of polarity in different portions of the output light beam provides an indication of the bits of information represented by corresponding portions of the device determining the lasing action of the filaments from which the light portions emanate.

As contemplated by the present invention, the device arranged in the laser cavity comprises a plate of magnetic material having a highly reflecting surface from which the light is reflected as it oscillates during a lasing action. When an area on the plate from which light is reflected has a magnetic charge applied thereto, the light components become rotated some degree varying with the

2 magnetization, the angle of incidence, and the wave length of the light. Generally, the reflected light exhibits a small ellipticity which is due to the magnetization. This action is well known as the Kerr magneto-optic effect. In most cases, however, the effect of a metallic reflection will be superimposed on the Kerr magneto-optic effect because most of the strongly magnetizable materials are metals.

An object of this invention is to provide an improved means for producing a beam of polarized light.

Another object is to provide a laser having means arranged within its lasing cavity and acting upon the light produced for polarizing it in a predetermined manner.

Still another object is to provide a member arranged in the cavity of a laser and having different areas magnetized in directions representative of bits of information, different portions of the light produced by said laser acting upon said areas and becoming polarized in directions corresponding to the directions of magnetization.

Yet another object is to provide an improved means for producing polarizing modulation of light in a laser.

Another object is to provide means arranged in the cavity of a laser and acting to polarize light by a magneto-optic effect.

The foregoing and other objects, features and advantages of the invention will be apparent from the following more particular description of preferred embodiments of the invention as illustrated in the accompanying drawings.

In the drawings:

FIG. 1 is a view of a laser having means associated therewith for producing a beam of polarized light.

FIG. 2 shows an arrangement like FIG. 1 but including means for eliminating the effect of metallic reflections obtained when light is reflected from the polarizing means.

FIG. 3 represents the polarity of the light obtained from the arrangement of FIG. 2 with the magnetism in the magnetic mirror in one direction or another.

FIG. 4 is a diagram showing the vectors of incident and reflected light beams from the magnetic mirror.

Figure 7:
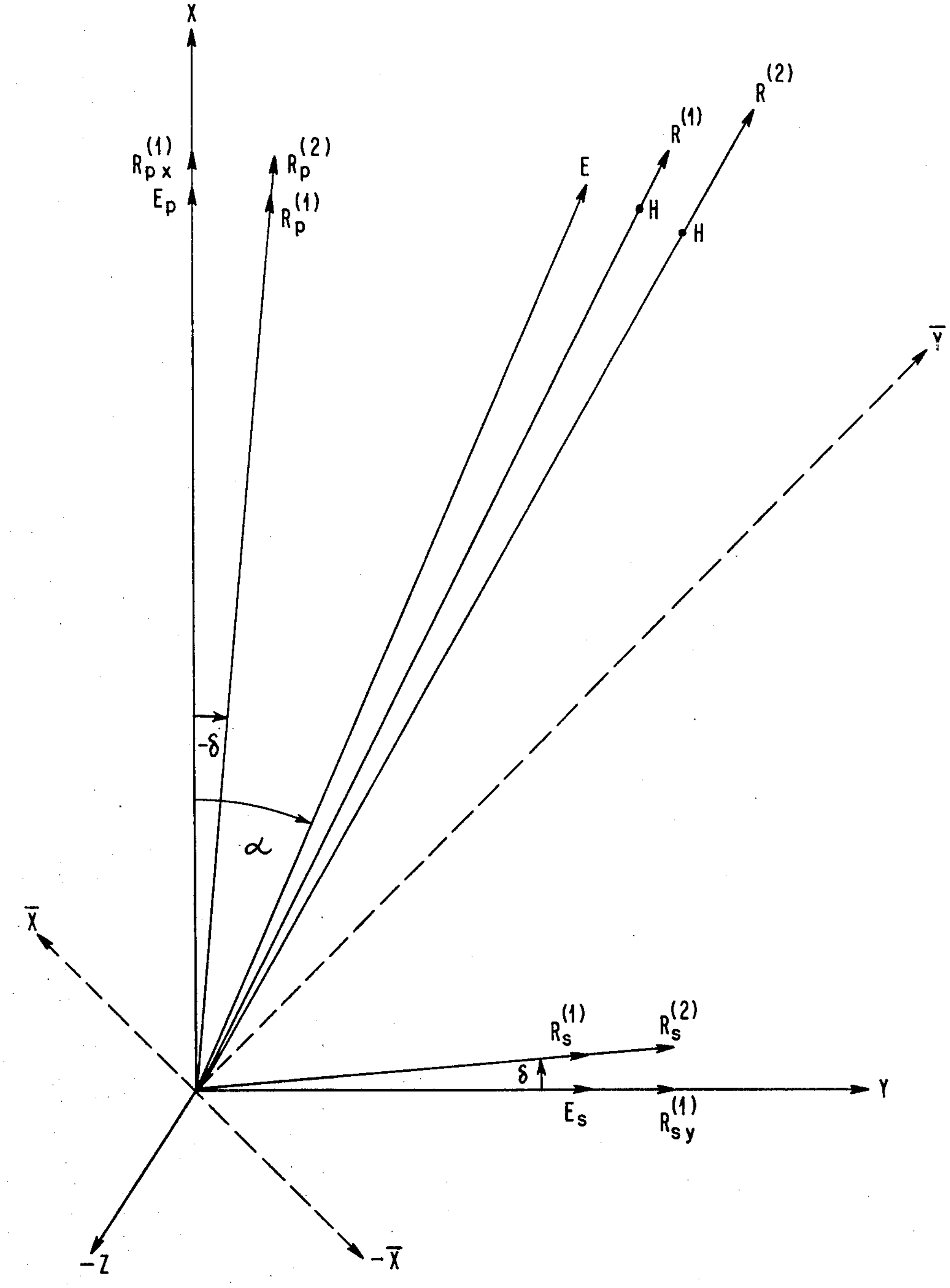

FIG. 5 indicates variations between different light characteristics with changes in angles of incidence.

FIG. 6 is a diagram showing the vectors of incident and reflected light when using a compensating mirror in the manner shown in FIG. 2.

FIG. 7 is a vector diagram representing the manner in which light becomes polarized on repeated reflections from a magnetic mirror.

FIG. 8 shows how the surface of the magnetic mirror may be magnetized to represent many bits of information.

FIG. 9 shows the magnetic mirror with external means for switching the direction of magnetism.

Referring to the drawings and more particularly to FIG. 1, it will be noted that there is shown a laser including a negative temperature medium 1, such as a ruby rod, subjected to the energy of a pumping light L. Under the action of this energy, electrons within the medium are excited to metastable levels and emit photons of light spontaneously or by stimulation. Arranged at one end of the medium 1 normal to its axis is a mirror 2 for reflecting light back to the medium. At the other end of the medium 1 is a plate 3 of magnetic material having a highly reflecting surface 4 at its side adjacent the medium. Plate 3 is inclined so as to reflect the light from the medium 1 to a mirror 6. Light striking the mirror 6 is reflected back to the surface 4 and then through the medium 1 to the mirror 2. It will be seen that this arrangement results in the reflection of light from the surface 4 twice for each passage of light through the medium 1. Thus, the laser cavity is made by mirrors 2 and 6, and the ruby rod 1 is the amplifying medium which magnifies the light in phase.

If the ruby is properly oriented and nothing more is done, the light produced is unpolarized except for an uncertain elliptical polarization from metallic reflections when the reflecting surface 4 is metallic. If, however, the plate 3 is magnetized in some direction lying in the surface 4, a magneto-optic effect takes place with a definite polarizing influence each time light is reflected from the surface. After a number of reflections, the light becomes fully elliptically polarized in a direction depending on the direction of magnetization on the surface 4. It is essential with this arrangement, however, that the direction of magnetization not only lie in the surface 4 but also be parallel to the plane of incidence. The reason for this will be described more in detail later. Either of the mirrors 2 and 6 may be made partially reflecting while the other is made fully reflecting. The partially reflecting mirror passes some of the light engaging it to provide a usable output beam of light.

In the arrangement shown in FIG. 1 there is some metallic reflection obtained from the plate 3. This reflection as well as the magneto-optic effect has an influence on the polarization state of the light produced. The pure metallic reflection results in a broadening of the elliptical shape of the polarized light so that the major axis of the ellipse is not clearly defined. There is shown in FIG. 2 an arrangement similar to that of FIG. 1 but having a compensating mirror 8 inserted in the light path between the plate 3 and the mirror 6. The compensating mirror is arranged in a plane normal to the surface 4 of plate 3 and at an angle of 45 degrees to the plane of incidence of light acting on surface 4. It operates to exclude the elliptical polarizing influence of the pure metallic reflection from the surface 4. The ellipticity of the polarized light, now determined only by the magneto-optic effect, is much flatter and has a clearly defined major axis as shown by FIG. 3. When the magnetization lies in the surface 4 in the direction of $M_1$, parallel to the plane of incidence for the incident and reflected light beams, the resulting polarized light is like that represented by the ellipse 10 of FIG. 3. If the direction of magnetization is reversed as indicated by $M_2$, the polarity of the light becomes like that represented by the ellipse 12.

The geometric properties of the light acting on the surface 4 of plate 3 are indicated in FIG. 4 where an incident beam of light I bounces off the surface as a reflected beam R. Plate 3 is magnetized in the direction M which is parallel to the plane of incidence, this being the plane in which the beams I and R as well as the normal N to the surface lie. The angles of incidence and reflection are designated, respectively, by $\theta_i$ and $\theta_r$. The electric vectors of the incident beam parallel and perpendicular to the plane of incidence are indicated respectively by $E_p$ and $E_s$ while the corresponding vectors of the reflected beam are designated by $R_p$ and $R_s$. The metallic reflection causes a change in the amplitudes of the reflected vectors and also introduces a phase difference $\Delta$ between them. The reflected components are:

$$R_p=r_pE_p$$
$$R_s=r_sE_s$$
$$r_p=\rho_pe^{i\phi_p}$$
$$r_s=\rho_se^{i\phi_s}$$

where:

$r_p$ and $r_s$ are complex quantities while $\rho_p$ and $\rho_s$ equal the amplitudes of $r_p$ and $r_s$.

The phase difference ($\phi_p-\phi_s=\Delta$) and the ratio $\rho_s/\rho_p=P$, which characterize the change in the state of polarization of light on reflection from a metal, are shown plotted against the angle of incidence $\theta_i$ in FIG. 5.

The longitudinal magneto-optic effect causes further changes in the reflected components which are usually represented as follows:

$$R_p=r_pE_p+r_mE_s$$
$$R_s=r_sE_s-r_mE_p$$

The second terms on the right sides of these equations result from the magneto-optic effect.

$$r_m=Qe^{iq}$$

with Q=amplitude of $r_m$ and $q$=phase.

The fact that the $R_p$ and $R_s$ equations include the magneto-optic parameter with opposite signs is what gives the desired polarizing result from the magnetized surface. Only proportional changes in the reflected amplitudes due to reflection losses should be allowed since these can be equalized by light amplification. To accomplish this, the metallic reflection influence which changes the state of polarization must be eliminated. This is accomplished by inserting the compensating mirror 8 in such a way that the light reflected from the magnetic surface 4 is bounced from the compensating mirror in the direction of the component $R_s$, as shown in FIG. 6. The compensating mirror introduces the same phase difference ($\Delta$) and attenuates the components parallel and perpendicular to the plane of incidence for the same quantity P as the magnetic mirror did. The components $R'_p$ and $R'_s$ (FIG. 6) now have the same phase relation as $E_p$ and $E_s$ have. Likewise the ratio $E_p/E_s=R'_p/R'_s$. This still holds even when the light path becomes inverted. The mirrors 2 and 6 in FIG. 2 will not change the state of polarization, and it is assumed that the laser does not prefer any polarization direction. The magneto-optic effect is, therefore, the only thing which determines polarization.

In FIG. 7 where it is shown by vectors the manner in which the light becomes polarized as it is repeatedly reflected from the plate 2, it is assumed that the incident light propagates parallel to the Z direction and that the XZ plane is the plane of incidence. The reflected beam is assumed to propagate in the same direction as the incident beam in order that the plottings for the incident and reflected beams may be superimposed. The incident light has its electric vector E at an angle $\alpha$ with the X axis. The component of E parallel to the plane of incidence is $E_p$, and the component perpendicular to the plane of incidence is $E_s$. These components are rotated for the angles $-\delta$ and $+\delta$, respectively. This is due to the amplitude Q of the complex magneto-optic coefficient $r_m$. The phase $q$ is dropped for sake of simplicity in calculations.

The components of E are:

$$E_p=E\cos\alpha$$
$$E_s=E\sin\alpha$$

The rotated components after the first reflection with the influences of the pure metallic reflection excluded are:

$$R_p^{(1)}=E_p\cos\delta+E_s\sin\delta=E\cos(\alpha-\delta)$$
$$R_s^{(1)}=E_s\cos\delta+E_p\sin\delta=E\sin(\alpha-\delta)$$

After the second reflection on the magnetic plate the components become:

$$R_p^{(2)}=R_p^{(1)}\cos\delta+R_s^{(1)}\sin\delta=E\cos(\alpha-2\delta)$$
$$R_s^{(2)}=R_s^{(1)}\cos\delta+R_p^{(1)}\sin\delta=E\sin(\alpha-2\delta)$$

After the $n^{th}$ reflection $$R_p^{(n)}=E\cos(\alpha-n\delta)$$
$$R_s^{(n)}=E\sin(\alpha+n\delta)$$

After the first reflection, the new components are $R_p^{(1)}$ and $R_s^{(1)}$ and their resulting electric vector is $R^{(1)}$. The new components of $R^{(1)}$ in the X and Y directions are $R_{px}^{(1)}$ and $R_{sy}^{(1)}$. At the next bounce on the magnetic mirror, the components $R_p^{(1)}$ and $R_s^{(1)}$ for $R^{(1)}$ are rotated $-\delta$ and $+\delta$, respectively, and the resulting vector is $R^{(2)}$. It will be noted that each resulting vector is rotated further toward the $\overline{Y}$ direction. After a number of reflections, the electric vector lies in the $\overline{Y}$ direction and stays there. As shown in FIG. 7, the reflected electric vectors R grow with respect to E. This is due to the fact that the magneto-optic phase was dropped in constructing the reflected vectors. If the magneto-optic phase was taken into account, elliptical oscillations of $R^{(1)}$ and $R^{(2)}$ would be obtained. The points marked H on the R vectors indicate approximately the length of the main axes of the oscillation ellipses. The excess of $R^{(1)}$ and $R^{(2)}$ is a measure of the phase difference introduced into the rotated components.

An inversion of the magnetization M in the magnetic mirror causes the *p* and *s* components of the electric vector to be rotated in the opposite direction. This results in a rotation of the light vector towards the $\overline{X}$ direction.

The mechanisms shown are capable of changing the polarization by a growing process as reflections from the magnetic mirror take place until a final state of polarization is reached. This state of polarization is elliptical with the main axis being parallel to either $\overline{X}$ or $\overline{Y}$ axis depending on the direction of magnetization M.

If the surface 4 of the plate 3 has different areas magnetized in different directions as indicated in FIG. 8, each of the areas determines the polarization status of the light emanating from the filament of the laser medium with which it is associated. The output beam then has its portions corresponding to the different areas elliptically polarized in one direction or another depending on the direction of magnetization for the areas. This arrangement permits a simultaneous reading of many bits of information stored in plate 3.

The direction of magnetism in the surface 4 of the plate 3, as shown in FIGS. 1 and 2, may be switched to either direction by external means shown in FIG. 9. This means comprises, as shown herein, a conductor 14 taking turns about the opposite ends of the plate 3 and being connectable by a switch 15 in either direction to a source of electric energy 16. In place of the mechanical switch 15 there may be employed, if desired, an electronic switching means which permits high switching speeds.

While the invention has been particularly shown and described with reference to preferred embodiments thereof, it will be understood by those skilled in the art that various changes in form and details may be made therein without departing from the spirit and scope of the invention.

What is claimed is:

1. A mechanism operating in conjunction with a laser for polarizing the light emanating therefrom, said mechanism comprising:

a plate of magnetic material arranged in the laser cavity in a plane at an acute angle to the path of the lasing light and having a highly reflecting surface from which the light is reflected during the lasing action, and said plate being magnetized in a direction lying in its reflecting surface parallel to the plane of incidence of light acting upon it from said laser, the light becoming rotated and elliptically polarized by reflections from said surface due to magneto-optic effects.

2. The mechanism of claim 1 including:

external means for switching the direction of magnetism in said plate, said mechanism operating to effect an elliptical polarization of said light with its major axis lying in one or another of two planes at 90 degrees to each other depending upon the direction of magnetization.

3. The mechanism of claim 2 in which said external means comprises a conductor taking turns about opposite ends of said plate, and means for connecting the ends of said conductor selectively to opposite sides of a source of electric energy.

4. The mechanism of claim 1 including a mirror arranged within the cavity of said laser adjacent said plate so that light is reflected between the mirror and the surface of the plate in a manner to exclude any elliptical polarizing influence due to pure metallic reflection from the surface of said plate.

5. The mechanism of claim 1 including a mirror arranged in a plane normal to the reflecting surface of said plate and at a predetermined angle to the plane of incidence of light reflected from said surface so that light is reflected between the mirror and the surface of the plate in a manner to exclude any elliptical polarizing influence due to pure metallic reflection from the surface of said plate.

6. A mechanism operating in conjunction with a laser for polarizing different portions of the light beam emanating therefrom in either one direction or another representative of bits of information to be transmitted comprising, in combination, a plate of magnetic material arranged in the laser cavity in a plane at an acute angle to the path of the lasing light and having highly reflecting surfaces from which different portions of the light are reflected during the lasing action, and each of said surfaces being magnetized in either one direction or another lying in its surface parallel to the plane of incidence of light acting upon it from said laser.

7. The mechanism of claim 6 including a comp-nsating mirror arranged adjacent said plate within the laser cavity in a plane normal to the reflecting surface of the plate for reflecting light between them in a manner to exclude any pure metallic reflections from said surfaces.

8. A mechanism for producing a beam of polarized light comprising, in combination:

an active laser medium, a first mirror arranged at one end of said medium for reflecting back to said medium light emanating therefrom, a plate of magnetic material arranged at the opposite end of said medium and having a highly reflecting surface lying in a plane forming an angle less than 90 degrees with the axis of said medium, said plate being magnetized in a direction lying in said surface parallel to the plane of incidence of light acting thereon, a second mirror arranged to receive light from said surface on said plate and reflect it back over the same path, and one or the other of said first and second mirrors being only partially reflecting whereby light passes through it to form an output light beam, said light on each reflection from said surface becoming slightly polarized elliptically by magneto-optic effects until it becomes fully polarized after a number of passes between said first and second mirrors.

9. The mechanism of claim 8 including means for magnetizing said plate surface in either one or another of opposite directions selectively.

10. A mechanism for producing a beam of polarized light comprising, in combination:

an active laser medium, a first mirror for reflecting back to said medium light emanating therefrom, a plate of magnetic material arranged at the opposite end of said medium and having a highly reflecting surface lying in a plane forming an angle of approximately 45 degrees with the axis of said medium, said plate being magnetized in a direction lying in said surface parallel to the plane of incidence of light acting thereon, a compensating mirror arranged in a plane normal to the reflecting surface of said plate and at an angle of approximately 45 degrees to the plane of incidence of light reflected from said surface so that light is reflected between them in a manner to exclude any elliptical polarizing influence due to pure metallic reflection from the surface of said plate, a second mirror arranged to receive light from said compensating mirror and to reflect it back over the same path, and one or the other of said first and second mirrors being only partially reflecting whereby light passes through it to form an output light beam, said light on each reflection from said surface becoming slightly rotated and polarized elliptically by magneto-optic effects until it becomes fully polarized after a number of passes between said first and second mirrors.

11. A mechanism for affecting the delivery of light obtained from a laser comprising in combination:

a negative temperature medium which is operable when activated to emit unpolarized coherent light lasing within different filaments of said medium;

a partially reflecting mirror at one end of said medium for returning part of the light to said medium and passing the remainder of the light as an output beam;

means at the other end of said medium for acting upon the emitted light to effect its return through filaments from which it was emitted and maintain lasing action within them; and adjustable means positioned within the laser cavity for imparting predetermined polarization states to the unpolarized filaments of emitted light so as to enable only selected ones of said filaments to be passed in the output beam of light with one state of polarization.

12. A mechanism for affecting the delivery of light obtained from a laser comprising in combination:

a negative temperature medium which is operable when activated to emit unpolarized coherent light lasing within different filaments of said medium;

a partially reflecting mirror at one end of said medium for returning part of the light to said medium and passing the remainder of the light as an output beam;

means at the other end of said medium for acting upon the emitted light to effect its return through filaments from which it was emitted and maintain lasing action within them; and alterable means positioned within the laser cavity for imparting predetermined polarization states to the unpolarized filaments of emitted light to enable predetermined ones of said filaments to be emitted in the output beam of light with one state of polarization and other ones of said filaments to be emitted in the output beam of light with another state of polarization.

13. A mechanism for affecting the delivery of light obtained from a laser comprising in combination:

a negative temperature medium which is operable when activated to emit unpolarized coherent light lasing within different filaments of said medium;

a partially reflecting mirror at one end of said medium for returning part of the light to said medium and passing the remainder of the light as an output beam;

means at the other end of said medium for acting upon the emitted light to effect its return through filaments from which it was emitted and maintain lasing action within them; and variably patterned means positioned within the laser cavity for imparting predetermined polarization states to the unpolarized filaments of the emitted light according to the pattern to enable only filaments corresponding to selected ones of the pattern to be emitted in the output beam of light with one state of polarization.

14. A mechanism for affecting the delivery of light obtained from a laser comprising in combination:

a negative temperature medium which is operable when activated to emit unpolarized coherent light lasing within different filaments of said medium;

a partially reflecting mirror at one end of said medium for returning part of the light to said medium and passing the remainder of the light as an output beam;

means at the other end of said medium for acting upon the emitted light to effect its return through filaments from which it was emitted and maintain lasing action within them; and variably patterned means positioned within the laser cavity for imparting predetermined polarization states to the unpolarized filaments of the emitted light according to the pattern to enable only filaments corresponding to selected ones of the pattern to be emitted in the output beam of light with one state of polarization, the non-selected ones of said filaments having another state of polarization.

References Cited

UNITED STATES PATENTS 3,293,565 12/1966 Hardy ............. 331—94.5

JEWELL H. PEDERSEN, Primary Examiner

WILLIAM L. SIKES, Assistant Examiner

U.S. Cl. X.R.

350—153, 160